United States Patent
Aziz et al.

(10) Patent No.: US 8,467,440 B2
(45) Date of Patent: Jun. 18, 2013

(54) COMPENSATED PHASE DETECTOR FOR GENERATING ONE OR MORE CLOCK SIGNALS USING DFE DETECTED DATA IN A RECEIVER

(75) Inventors: Pervez M. Aziz, Dallas, TX (US); Adam Healey, Newburyport, MA (US)

(73) Assignee: LSI Corporation, Milpitas, CA (US)

( * ) Notice: Subject to any disclaimer, the term of this patent is extended or adjusted under 35 U.S.C. 154(b) by 441 days.

(21) Appl. No.: 12/776,681

(22) Filed: May 10, 2010

(65) Prior Publication Data

US 2011/0274154 A1    Nov. 10, 2011

(51) Int. Cl.
*H04B 1/38* (2006.01)
(52) U.S. Cl.
USPC ........... 375/233; 375/340; 375/342; 375/346; 375/348; 375/349; 375/350; 375/355
(58) Field of Classification Search
CPC ........ H04L 25/03057; H04L 2025/0349; H04L 25/03063; H04L 25/0307
USPC ................. 375/233, 229, 340, 342, 346, 348, 375/349, 350, 355
See application file for complete search history.

(56) References Cited

U.S. PATENT DOCUMENTS

| | | | |
|---|---|---|---|
| 2007/0195874 A1* | 8/2007 | Aziz et al. | 375/233 |
| 2008/0043830 A1* | 2/2008 | Simpson et al. | 375/233 |
| 2008/0069198 A1* | 3/2008 | Bhoja et al. | 375/233 |
| 2009/0086807 A1* | 4/2009 | Aziz et al. | 375/233 |

OTHER PUBLICATIONS

J. D. H. Alexander, "Clock Recovery from Random Binary Signals," Electronics Letters, 541-42 (Oct. 1975).
S. Kasturia and J. Winters; "Techniques for High-Speed Implementation of Nonlinear Cancellation"; IEEE Journal on Selected Areas in Communications, Jun. 1991, pp. 711-717.

\* cited by examiner

*Primary Examiner* — Sophia Vlahos (57) ABSTRACT

A method and apparatus generating one or more clock signals in a receiver employing decision-feedback equalization (DFE). A received signal is sampled by a data clock and a transition clock, generating a data sample signal and a transition sample signal, respectively. A DFE correction is performed by DFE circuitry on the data sample signal to generate DFE detected data bits. The transition sample signal is sliced using a weighted threshold value to generate transition data bits. One or more phase updates of the data clock and the transition clocks are in response to the DFE detected data bits and the transition data bits. The weighted threshold is calculated from at least one of the prior-received DFE detected data bits. In one embodiment, the DFE detection may also be dependent on an effective delay ($\lambda$) of the DFE circuit in relation to the received signal baud-period, T.

13 Claims, 8 Drawing Sheets

COMPENSATED PHASE DETECTOR FOR GENERATING ONE OR MORE CLOCK SIGNALS USING DFE DETECTED DATA IN A RECEIVER

TECHNICAL FIELD

The present invention relates to decision-feedback equalization techniques, and, in particular, to techniques for correcting phase detection in a clock generator by taking into consideration decision-feedback equalizer delays.

BACKGROUND

Digital communication receivers must sample an analog waveform and then reliably detect the sampled data. Signals arriving at a receiver are typically corrupted by intersymbol interference (ISI), crosstalk, echo, and other noise. Thus, receivers must both equalize the channel, to compensate for such corruptions, and detect the encoded signals at increasingly higher clock rates. Decision-feedback equalization (DFE) is a widely used technique for removing intersymbol interference and other noise. For a detailed discussion of decision feedback equalizers, see, for example, R. Gitlin et al., Digital Communication Principles, (Plenum Press 1992) and E. A. Lee and D. G. Messerschmitt, Digital Communications, (Kluwer Academic Press, 1988), each incorporated by reference herein in their entirety.

Generally, decision-feedback equalization utilizes a non-linear equalizer to equalize the channel using a feedback loop based on previously detected (or decided) data. In one typical DFE implementation, a received analog signal is sampled after DFE correction and compared to one or more thresholds to generate the detected data. The DFE correction, v(t), is subtracted in a feedback fashion to produce a DFE-corrected signal w(t). A clock, generated from the received signal by a Clock and Data Recovery (CDR) circuit, is generally used to sample the DFE-corrected signal and for the DFE operation. Typically, the entire DFE loop correction must be performed within one baud-period T of the received signal before the next correction is needed. At very high data rates, however, it is difficult to design circuits that operate this fast or to make them very accurate. Consequently, a number of techniques have been proposed or suggested for eliminating the DFE feedback loop by using precomputed the DFE terms in an "unrolled" DFE architecture. Since there is no DFE feedback loop, the process of generating the DFE "corrected" detections can be pipelined. In such a DFE precomputation implementation, the DFE correction is not fed back to correct the received signal, making the input to the CDR circuit non-DFE detected data. Thus, the CDR circuit processes unequalized data that still contains channel impairments.

An improved receiver is disclosed in "Method and Apparatus for Generating One or More Clock Signals for a Decision-Feedback Equalizer Using DFE Detected Data", by Aziz et al, U.S. Pat. No. 7,616,686, incorporated by reference herein in its entirety, utilizes a DFE-based phase detection architecture for clock and data recovery of a DFE equalized signal. The disclosed architecture effectively generates one or more clock signals for the decision-feedback equalizer using DFE detected data and DFE transition data. However, it has been observed that, under certain conditions, the generator of the clock signals can produce additional clock jitter. It is believed that the DFE correction to transition samples used by the CDR to generate the various clocks is one source of the increase in clock jitter. In particular, the jitter performance of the phase detector in the clock generator has been found to be dependent on the DFE delay. Thus, it is desirable to provide a phase detector that corrects for the DFE delay.

SUMMARY

In one embodiment, the present invention is a method of generating one or more clock signals in a receiver employing decision-feedback equalization (DFE). A received signal, having a period T, is sampled using a data clock and a transition clock to generate a data sample signal and a transition sample signal, respectively. A DFE correction is performed on the data sample signal to generate DFE detected data bits, the DFE correction having an effective delay ($\lambda$). The transition sample signal is sliced and latched using a weighted threshold value to generate corrected transition data. One or more phase updates for at least one of the data clock and the transition clock is generated based on the DFE detected data bits and the corrected transition data. The weighted threshold is calculated from at least one prior-received DFE detected data bit.

In another embodiment, the present invention is a receiver employing decision-feedback equalization (DFE). The receiver comprises first and second samplers, a DFE corrector, a detector, and a clock and data recovery circuit. The first sampler samples a received signal having a period T, in response to a data clock to generate a data sample signal. The second sampler samples the received signal in response to a transition clock to generate a transition sample signal. The DFE corrector corrects the data sample signal to generate DFE detected data bits, the DFE correction having an effective delay ($\lambda$). The detector latches the transition sample signal sliced using a weighted threshold value, calculated from at least one prior-received DFE detected data bit, to generate corrected transition data. The clock and data recovery circuit generates one or more phase updates for at least one of the data clock and the transition clock based on the DFE detected data bits and the corrected transition data.

BRIEF DESCRIPTION OF THE DRAWINGS

The aspects, features, and advantages of the present invention will become more fully apparent from the following detailed description, the appended claims, and the accompanying drawings in which like reference numerals identify similar or identical elements.

DETAILED DESCRIPTION

In addition to the patents referred to herein, each of the following patents and patent applications are incorporated herein in their entirety:

U.S. Pat. No. 7,599,461, titled "Method and Apparatus for Generating One or More Clock Signals for a Decision-Feedback Equalizer Using DFE Detected Data in the Presence of an Adverse Pattern", by Aziz et al.

U.S. Published Patent Application 2009/0161747, titled "Noise Prediction-Based Signal Detection and Cross-Talk Mitigation", by Aziz et al.

U.S. Published Patent Application 2006/0146959, titled "Look-Ahead Digital Loop Filter for Clock and Data Recovery", by Aziz et al.

As data rates increase for serializer/deserializer (SERDES) applications, the channel quality degrades and the use of decision feedback equalization (DFE) in conjunction with finite impulse response (TXFIR) and receive equalization (RXEQ) filtering is required to achieve the bit error rate (BER) performance needed for reliable communications. It is understood that the FIR function of the transmitter (TX) can be moved from the transmitter to the receiver (RX) and incorporated into the RXEQ function.

Figure 1:
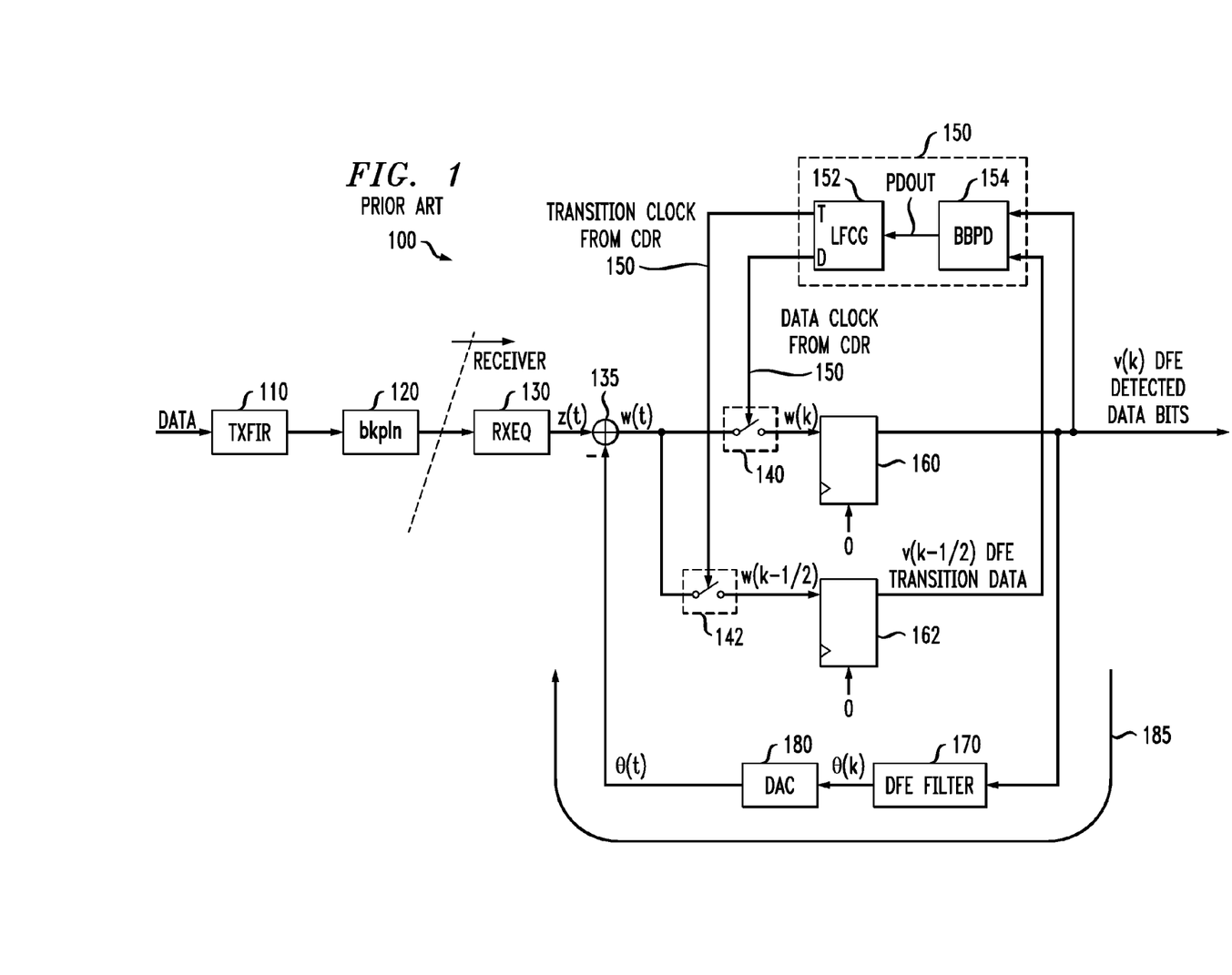
FIG. 1 is a block diagram of a serializer/deserializer (SERDES) communication channel having a receiver incorporating an analog DFE-based equalizer.

FIG. 1 is a block diagram of a typical SERDES communication channel 100 that incorporates a traditional DFE-based equalizer in addition to the TX and RX equalization. As shown in FIG. 1, the data is transmitted through a backplane channel 120 after optionally being equalized or filtered through a transmit FIR filter (TXFIR) 110. After passing though the backplane 120, the analog signal may optionally be filtered or equalized by a receive equalizer (RXEQ) 130 which may include, for example, of a continuous-time filter. The analog signal output of the RXEQ 130 is sampled at the baud rate, 1/T, by a switch 140 using a sampling clock generated by a clock/data recovery (CDR) circuit 150. A data detector 160 (a slicer-latch, described below) digitizes the samples by comparing the sample to an exemplary threshold of zero in response to the data clock generated by the CDR 150 and latches the result.

As previously indicated, the data detector 160 can be implemented as a slicer-latch (i.e., a decision device based on an amplitude threshold and a latch to hold the results of the decision device) or a more complicated detector such as a sequence detector. For high-speed applications, the data detector 160 (and transition detector 162, described in more detail below) is often implemented as a slicer-latch that is clocked by a CDR-generated clock. In addition to sampling the data signal, the detector 160 essentially quantizes the signal to a binary "1" or "0" based on the sampled analog value and a slicer threshold, $s_t$. If the input to the detector 160 at time k is w(k), then the output, v(k), of the detector 160 is given as follows:

$$v(k) = 1 \text{ if } w(k) > s_t$$
$$0 \text{ otherwise.}$$

In this example, the data detector 160 and transition detector 162 both have a slicer threshold of zero.

The phase of the analog waveform is typically unknown and there may be a frequency offset between the frequency at which the original data was transmitted and the nominal receiver sampling clock frequency. The function of the CDR 150 is to properly sample the analog waveform such that when the sampled waveform is passed through a data detector 160, the data is recovered properly despite the fact that the phase and frequency of the transmitted signal is not known. The CDR 150 is often an adaptive feedback circuit and the feedback loop must adjust the phase and frequency of the nominal clock to produce a modified recovered clock that can sample the analog waveform to allow proper data detection.

In general, the CDR 150 may be composed of several components, such as a phase detector (PD), a loop filter, and a clock generation circuit. As shown in FIG. 1, the exemplary CDR 150 is comprised of a loop filter 152, embodied as a digital loop filter and clock generator (LFCG), and a phase detector 154 embodied as a bang-bang phase detector (BBPD). For a general discussion of bang-bang phase detectors, see, for example, J. D. H. Alexander, "Clock Recovery from Random Binary Signals," Electronics Letters, 541-42 (Oct., 1975), incorporated by reference herein in its entirety.

Figure 2:
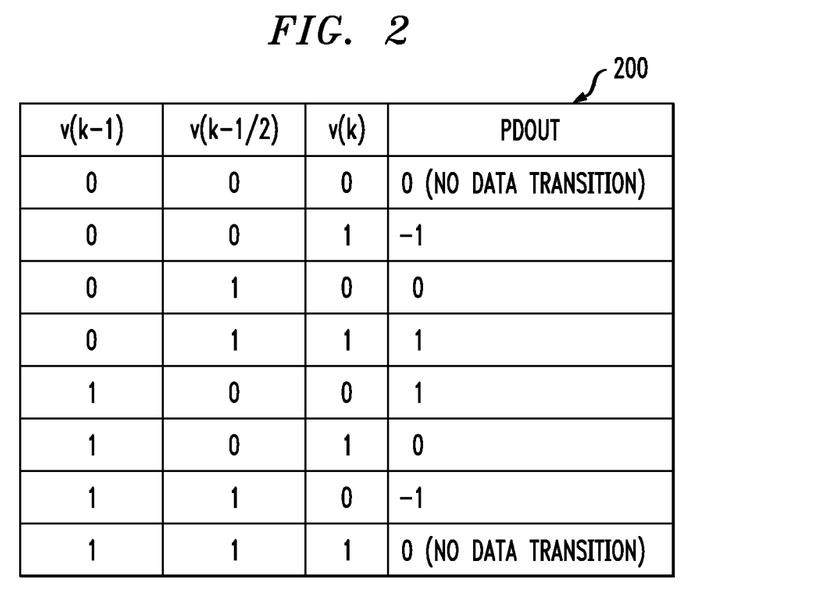
FIG. 2 is a table characterizing the input/output relationship of the BBPD of FIGS. 1, 3, and 5.

The BBPD 154 processes several quantities to compute an estimate of timing adjustments needed to properly sample the signal in a known manner. The LFCG 152 filters the timing adjustments before adjusting the phase of the sampling clocks. The CDR 150 generates two sampling clocks: the data sampling clock which samples the recovered data, and a transition sampling clock, that is offset from the data clock by half a baud-period, T/2, which is used to sample the "transition" data by switch 142. The transition detector 162, similar to the above-described data detector 150, digitizes the samples from switch 142 by comparing the sample to an exemplary threshold of zero in response to the transition clock generated by the CDR 150 and latches the result. The transition data bits are denoted as v(k−½) to indicate that the transition data bits are sampled relative to detected data bits v(k) by a phase offset of T/2. In addition, the BBPD 154 makes use of the detected data bits, the transition data bits, and a one baud-period delayed version of the detected data bits, v(k−1) (not shown explicitly in FIG. 1). Generally, the delayed data bits, v(k−1), can be created internally by the BBPD 154 from v(k). The exemplary look-up table 200 shown in FIG. 2 characterizes the BBPD input/output relationship. Since the BBPD 154 requires more than one sample per baud-period, the BBPD 154 is classified as an over-sampled phase detector.

Exemplary operation of an "analog" implementation of a DFE equalizer in FIG. 1 is as follows. It is noted that the DFE equalizer described herein is considered an analog implementation because compensation is done in the analog domain even though part of the equalizer is implemented in digital form. A DFE correction, Θ(t), generated by a DFE filter 170 and converted to a continuous-time analog signal by a digital-to-analog converter 180, is subtracted by an analog summer 135 from the output, z(t), of the RXEQ 130 to produce a DFE corrected signal w(t), where w(t)=z(t)−Θ(t). Then, the signal w(t) is sampled by a switch 140, such that w(k)=w(kT), T being the baud-period of the received analog signal. The sampled signal w(k) is then detected by a data detector 160 to produce the detected data bits v(k), and referred to herein as DFE detected data bits since the detected data is corrected by the DFE loop 185 comprising filter 170, DAC 180, and summer 135.

As discussed above, the CDR 150 generates two sampling clocks: a data sampling clock which is used to sample the recovered data and a transition sampling clock that is offset from the data clock by half a baud-period, T/2, which is used to sample the "transition" data. The analog signal out of the RXEQ 130 is sampled at the baud rate by a switch 142 using the transition clock. The transition sample signal w(k−½) is also sliced, by a second slicer-latch 162 to produce the transition data bits v(k−½). The transition data bits are denoted as v(k−½) to indicate that it is sampled relative to w(k) by a phase offset of T/2.

Because the output of detector 160 (the DFE detected data bits v(k)) is used by filter 170 to produce the filtered DFE output Θ(k) (which is in turn converted by the DAC 180 to the continuous time signal Θ(t)), the filter 170 uses past or delayed detected data bits to produce the DFE output Θ(k). For one embodiment of the filter 170, the output of the DFE filter 170 is:

$$\Theta(k) = \sum_{i=1}^{L} b(i)v(k-i)$$

where b(i) represents the coefficients or weights of the L-tap DFE filter 170. As evidenced from the above equation, this DFE filter 170 embodiment uses past or delayed detected data bits starting at v(k−1) and not the current detected data bits v(k). Thus, the filter 170 can delay (or store) current decisions for later use. Since an analog representation, w(t), of the OFF signal exists, it can be sampled directly by both the data clock using switch 140 (to produce w(k)) and the transition clock using switch 142 (to produce w(k−½)) and these sampled latched signals can drive the BBPD 154. For this circuit 100 to work, correction by the entire DFE correction by loop 185 is performed within one baud-period T before the next correction is needed. At very high data rates, it is difficult to design circuits that operate this fast or to make them very accurate.

Consequently, a well known technique may be employed whereby the DFE terms are "precomputed" and chosen based upon the amplitude value of y(k), and the DFE implemented in an "unrolled" form, without a feedback loop as shown in FIG. 1. Since there is no DFE feedback loop, the process of generating the DFE "corrected" decisions can be pipelined. A detailed explanation of an unrolled DEF architecture is found in "Techniques for High-Speed Implementation of Nonlinear Cancellation", by S. Kasturia and J. Winters, IEEE Journal on Selected Areas in Communications, June 1991, pp. 711-717, and incorporated by reference in its entirety herein.

Figure 3:
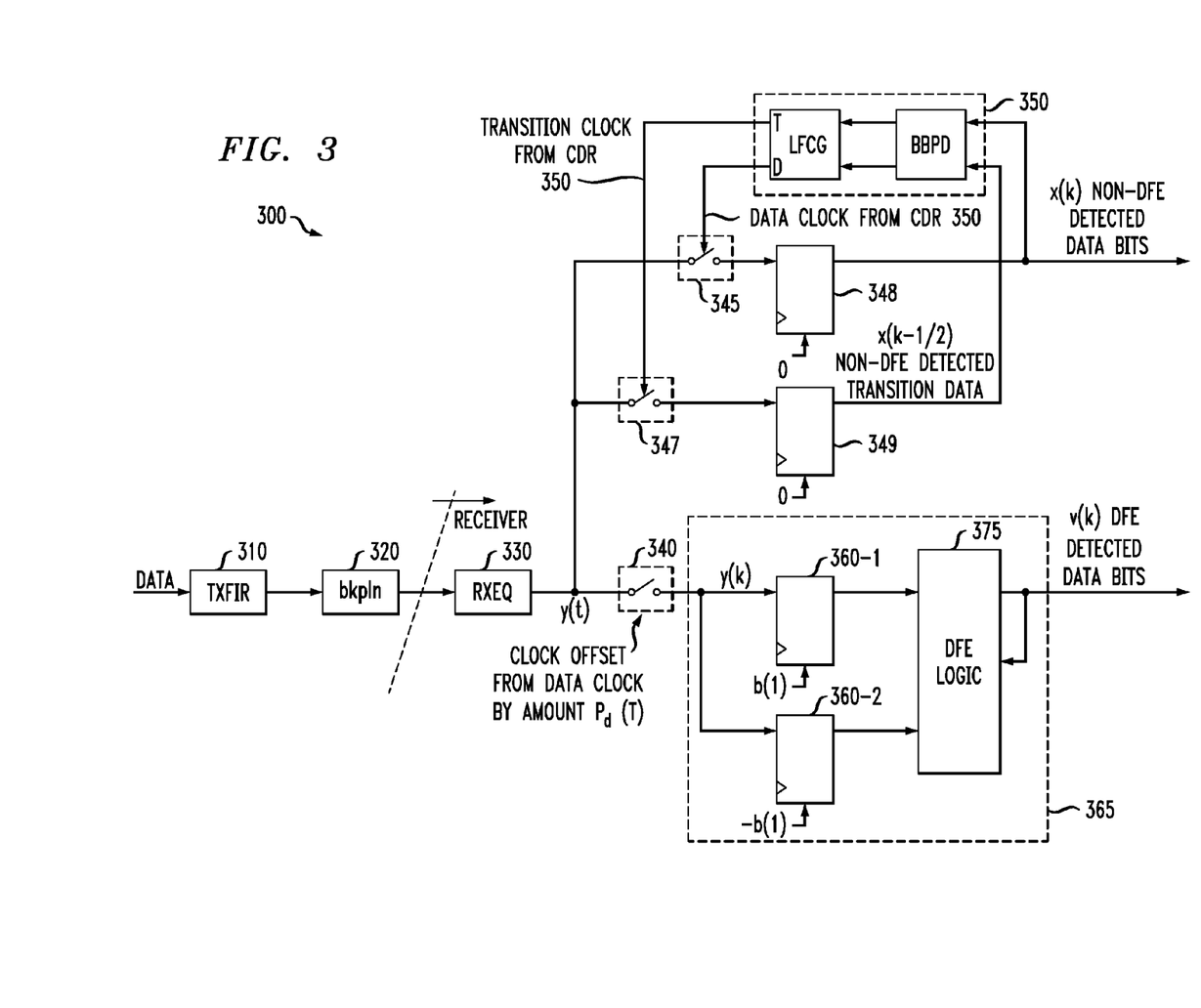
FIG. 3 illustrates a SERDES communication channel, similar to that of FIG. 1, having a receiver incorporating an exemplary unrolled DFE implementation of the analog DFE equalizer of FIG. 1.

FIG. 3 illustrates an exemplary channel 300 implementing the DFE loop 185 of FIG. 1 in an unrolled DFE implementation 365 for a single tap (L=1) DFE making use of the DFE tap coefficient or weight b(1). The decisions from the DFE detectors 360-1, 360-2 (having slicer thresholds of b(1) and −b(1), respectively) are combined with the delayed or preceding DFE detected data bits, v(k−1) (represented by the arrow fed back into the DFE computation logic 375) to produce the final DFE detected data bits v(k). The DFE logic 375 appropriately selects from the pre-computed decisions, which are the outputs of the detectors 360-1, 360-2 with thresholds b(1) and −b(1), respectively, based on the delayed DFE detected data bits v(k−1) as follows:

For the case when v(k−1)=1, v(k)=1 if y(k)>b(1)

v(k)=0 if y(k)<b(1);

or for the case when v(k−1)=0, v(k)=1 if y(k)>−b(1)

v(k)=0 if y(k)<−b(1).

The DFE computation logic 375 can be pipelined, thereby eliminating the bottleneck of having to complete the DFE computation in one baud-period, T.

Because the CDR and DFE operations may have different optimal sampling points, the DFE detectors 360-1, 360-2 and switch 340 should be driven with a data sampling clock with a sampling phase that may be offset from the normal CDR data clock sampling phase by some offset $p_d$ in units of baud interval T. Thus, the switch 340 in the DFE path is controlled by a clock that is offset from the CDR data clock by an amount equal to $p_d(T)$. The desired sampling phase, however, is dependent on the channel or other equalizer settings. Thus, the sampling phase can be adaptively determined using the techniques described in U.S. Pat. No. 7,606,301, titled "Method and Apparatus for Adaptively Establishing a Sampling Phase for Decision-Feedback Equalization" by Aziz et al. and incorporated by reference herein in its entirety.

Unlike the CDR 150 of FIG. 1, the CDR 350 does not receive DFE detected data bits v(k). Thus, BBPD 354 is processing non-DFE detected data bits x(k) from switch 348 and detector 348 and non-DFE detected transition data bits x(k−½) from switch 347 and detector 349. Because this data might contain channel impairments, CDR 350 may be forced to generate data and transition clocks with sub-optimal phases.

Figure 4:
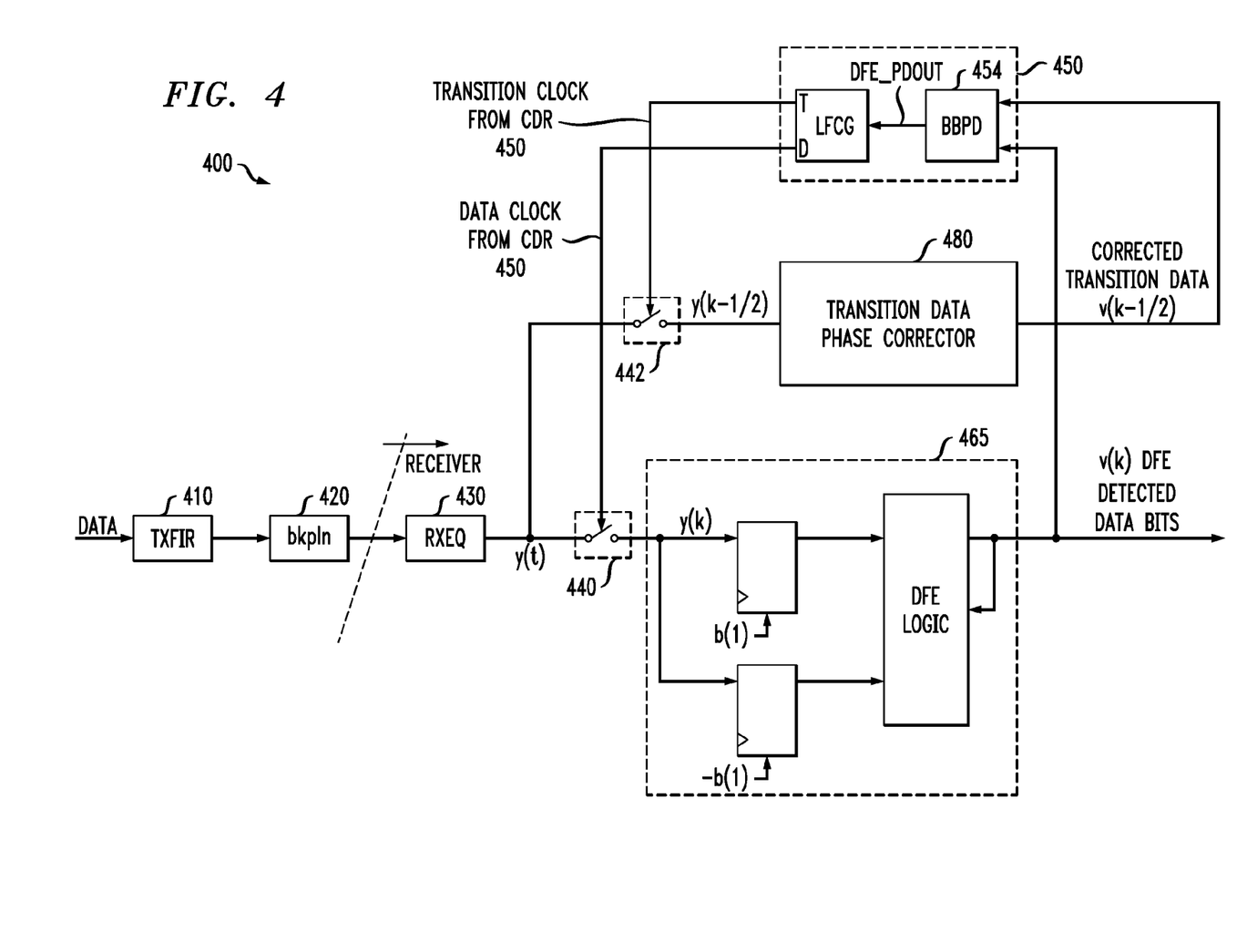
FIG. 4 is a block diagram of the SERDES communication channel of FIG. 3 having a receiver incorporating a transition signal phase correction circuit according to an exemplary embodiment of the invention.

FIG. 4 is a block diagram of a SERDES communication channel 400, similar to the channel 300 in FIG. 3, but incorporates a transition data phase corrector 480. The phase corrector 480 addresses the shortcomings of the transition data sampling shown in FIG. 3.

In FIG. 4, data is transmitted through a backplane channel 420 after optionally being equalized or filtered through a transmit FIR filter (TXFIR) 410. After passing though the backplane 420, the analog signal may optionally be filtered or equalized by a receive equalizer (RXEQ) 430. The analog output of the RXEQ 430 is sampled at the baud rate 1/T by switches 440, 442. The switch 440 uses a data clock generated by the clock/data recovery circuit 450 and switch 442 uses a transition clock generated by the clock/data recovery circuit 450, in a manner similar to that shown in FIG. 1 and described in connection therewith.

Also as shown in FIG. 4, the unrolled DFE implementation 465 operates as described for the corresponding DFE 365 in FIG. 3 and operates as described therewith. However, the data clock applied to switch 440 is not phase adjusted as described in relation to the data clock as with switch 340 of FIG. 3. Instead, the transition data phase corrector 480, as will be described in more detail below, adjusts the transition data to CDR 450, thereby supplying the correct data clock phase to switch 440 for proper sampling of the data signal.

To understand the function of the correction circuit 480, the transition signal sampling in the analog DFE implementation of FIG. 1 is analyzed as follows. Here, λ is the feedback delay in the analog feedback path 185. Because the analog DFE implementation described in FIG. 1, above, is used as the basis for a mathematically deriving the corresponding transition clock signal that is needed for a single-tap, unrolled DFE architecture, the correct DFE transition signal depends on the analog feedback delay as follows:

$$v(k-1/2) =$$

$$\begin{cases} \text{sgn}(y(k-T/2) - b(1)v(k-1)) & \text{if } 0 \le \lambda < T/2 \quad (1) \\ \text{sgn}(y(k-T/2) - b(1)[v(k-1) + v(k-2)]/2) & \text{if } \lambda = T/2 \quad (2) \\ \text{sgn}(y(k-T/2) - b(1)v(k-2)) & \text{if } T/2 < \lambda \le T \quad (3) \end{cases}$$

By knowing λ, the correct DFE transition signal is selected.

Figure 5:
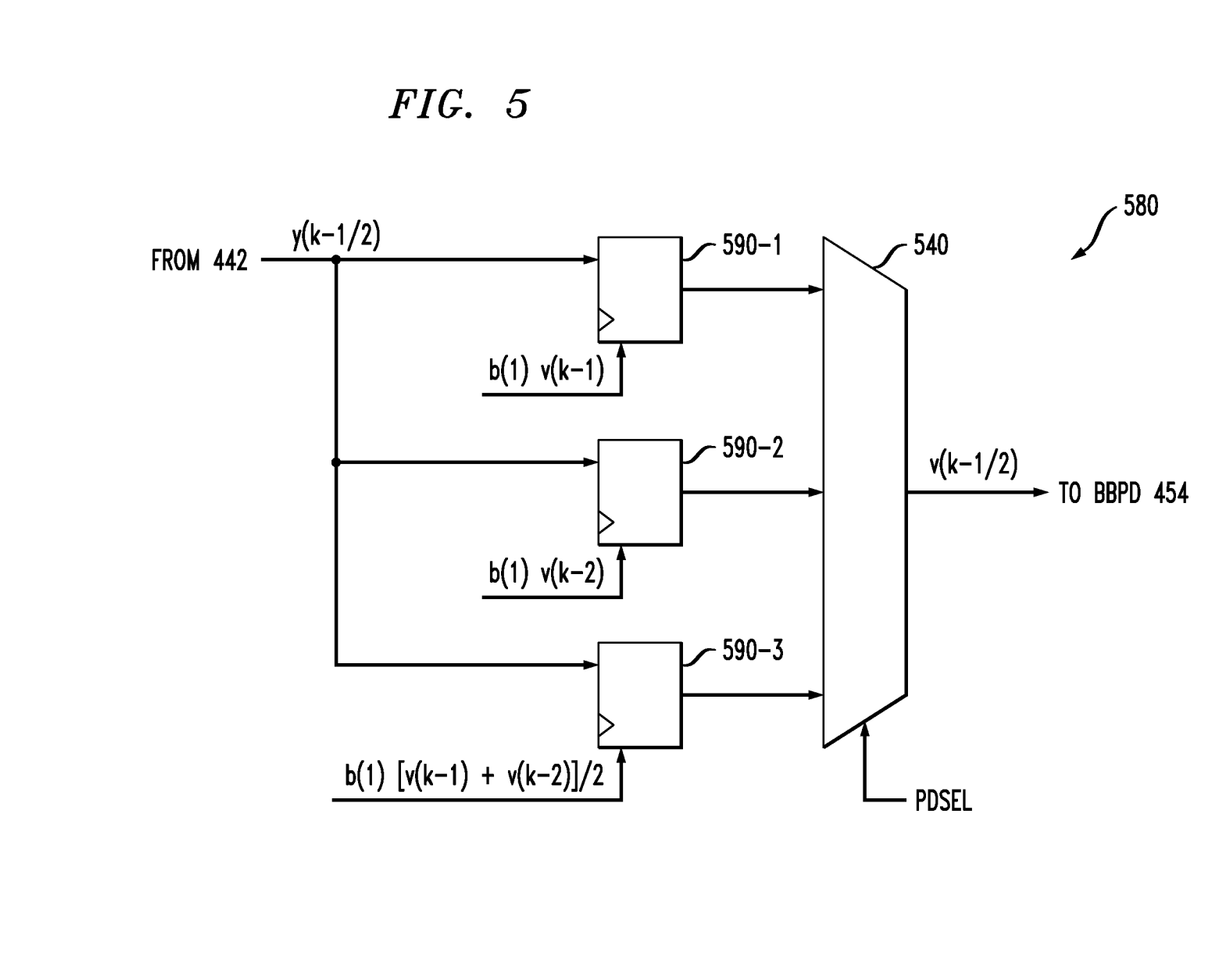
FIG. 5 is a simplified block diagram of a transition signal phase corrector according to an embodiment of the invention.
Figure 6:
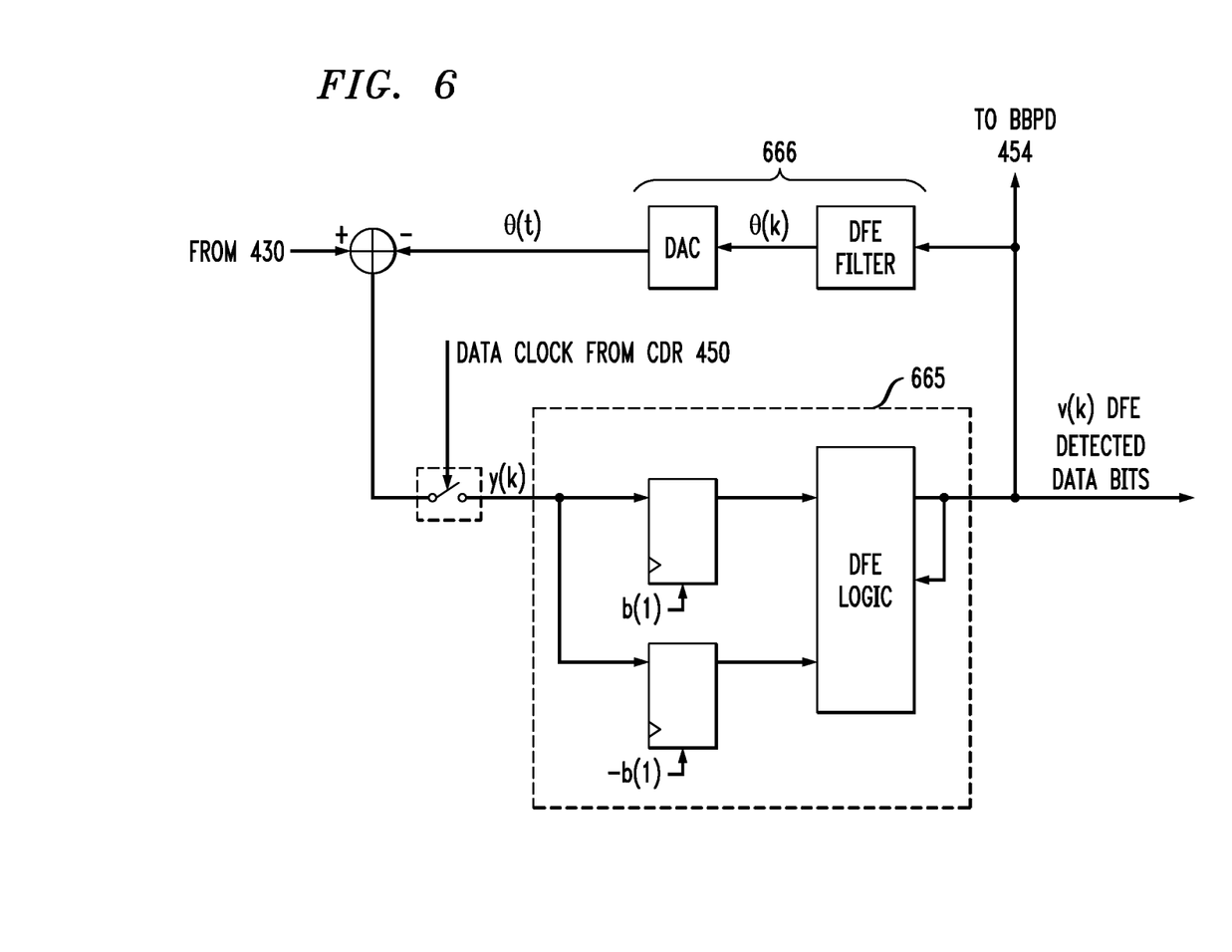
FIG. 6 is a partial block diagram of a portion of a DFE-based receiver illustrating use of a hybrid DFE architecture.

An exemplary implementation 580 of the transition data phase corrector 480 of FIG. 4 that implements the above equations is shown in FIG. 5 for the unrolled DFE implementation 465 in FIG. 4. A control signal, PDSEL, is used to select the desired corrected transition sample signal from a selected one of the detectors 590-1, 590-2, 590-3 for the current bit being received. In this example, the slicer threshold input to detector 590-1 is b(1)v(k−1) to implement above Eqn. 1, the slicer threshold input to detector 590-2 is b(1)[v(k−1)+v(k−2)]/2 to implement above Eqn. 2, and the slicer threshold input to detector 590-3 is b(1) v(k−2) to implement above Eqn. 3. The control signal PDSEL may a fixed, i.e., a fixed one of the inputs to multiplexer 540 may be selected, or may changed should the delay λ vary because, for example, the DFE implementation 465 is reconfigurable. Alternate approaches to the control of, and inputs to, the multiplexer 540 are discussed below in connection with FIGS. 7 and 8. Further, as discussed in more detail below, the above equations may also be used in connection with the analog DFE embodiment in FIG. 1 (using, z(k−T/2) in the above equations), or in a hybrid DFE embodiment having an unrolled portion 665 and an analog loop portion 556 as shown in a simplified block diagram in FIG. 6, generally used when implementing higher-order DFE designs. For the hybrid implementation, λ is the loop delay of an equivalent analog implementation (such as the loop 185 in FIG. 1) of the hybrid DFE of portion 665 and portion 666, as discussed above. It is further understood that the condition λ=T/2 may be so infrequently encountered that the detector 590-3 may be removed along with the associated input to the multiplexer 540.

Because the slicer threshold inputs to the detectors 590-1, 590-2, and 590-3 are dependent on previously received recovered data, e.g. v(k−1), a phase detector comprising CDR 450 and phase corrector 480, implemented using the transition signal phase corrector 580 in FIG. 5, may be referred to as a dynamic phase detector because the phase of the clocks generated by CDR 450 is at least partially dependent on the previously received recovered data.

Figure 7:
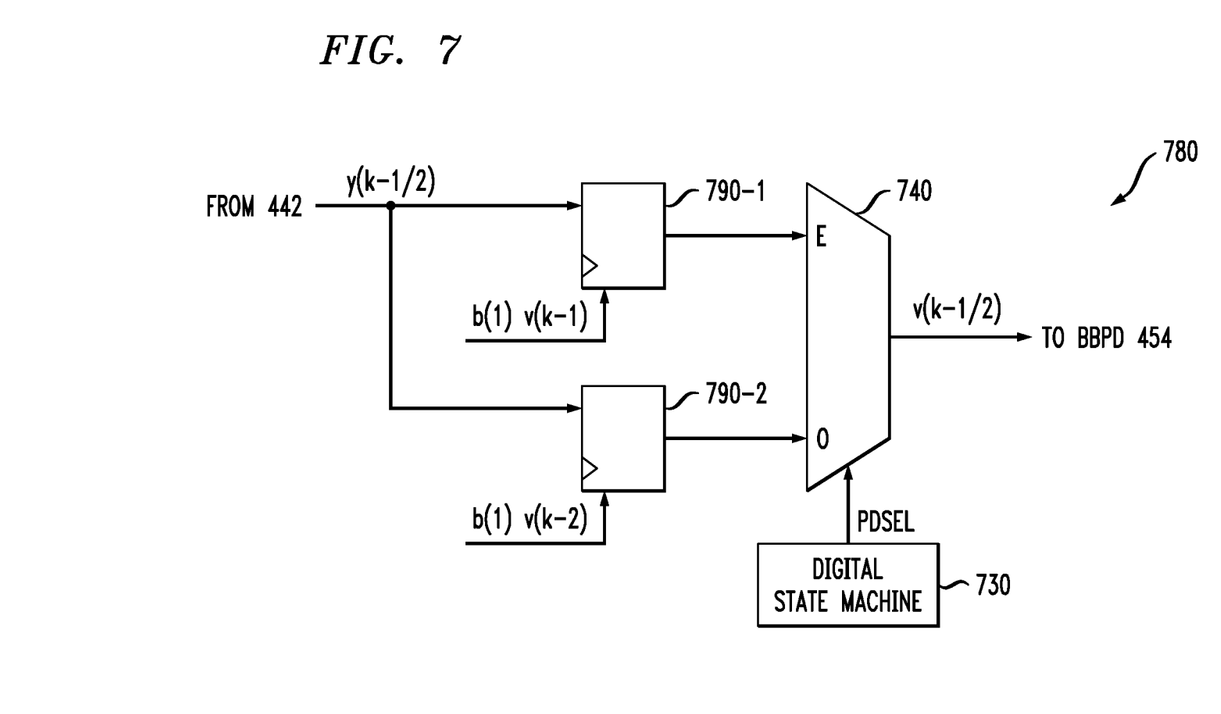
FIG. 7 is a simplified block diagram of a transition signal phase corrector according to another embodiment of the invention.
Figure 8:
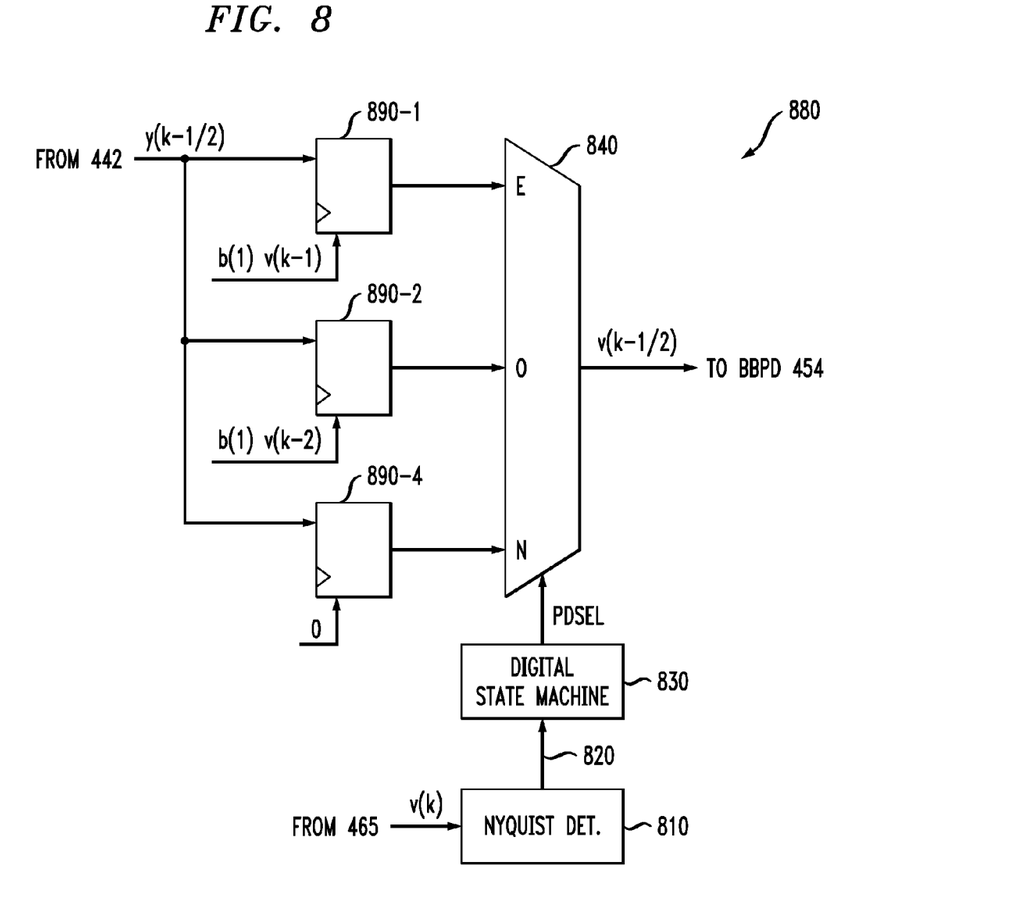
FIG. 8 is a simplified block diagram of a transition signal phase corrector according to still another embodiment of the invention.

In FIG. 7, an alternating phase correction approach 880 to the transition data phase corrector circuit 480 in FIG. 4 is illustrated. Under certain conditions, e.g. when the sampling phase is changing due to self-generated jitter by CDR 450 or other jitter impairments, using just one of the above mathematically derived corrections (Eqns. 1-3) may result in suboptimal phase correction. In this case, the above phase detector equations may need to be changed dynamically with respect to time. In this embodiment, referred to herein as an alternating phase detector (ALTPD), the phase corrector equation for the transition signal is selected based on an odd-even alternation sequence produced by a digital state machine 730 to determine the PDSEL signal state. In this example, for every bit being received, the multiplexer 740 is reconfigured to select the other input thereto. The other elements of FIG. 7 operate in the same manner as the corresponding like-numbered element in FIG. 5.

Should a long string of alternating ones and zeros (a Nyquist data pattern) be received, neither the ALTPD approach of FIG. 7 or any of the other phase correction approaches discussed above may work well. Instead, a phase corrector circuit 880 in FIG. 8 incorporates phase detector pattern qualification based on a received Nyquist data pattern. The embodiment of FIG. 8 extends the circuit 780 of FIG. 7 to include a Nyquist pattern detector 810 that generates a control signal 820 upon detecting a Nyquist pattern in the DFE detected data bits v(k). The control signal 820 controls the operation of the state machine 830 so that multiplexer 840 selects sliced (threshold is set to 0) transition sample signal from detector 890-4 at input N whenever a Nyquist pattern is detected, resulting in (k−½)=sgn(y(k−½)). The other elements of FIG. 8 operate in the same manner as the corresponding like-numbered elements in FIG. 7. Instead of v(k) being used by detector 810, non-DFE detected data, x(k) may be used.

For purposes of this description and unless explicitly stated otherwise, each numerical value and range should be interpreted as being approximate as if the word "about" or "approximately" preceded the value of the value or range. Further, signals and corresponding nodes, ports, inputs, or outputs may be referred to by the same name and are interchangeable. Additionally, reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the terms "implementation" and "example."

Also for purposes of this description, the terms "couple," "coupling," "coupled," "connect," "connecting," or "connected," refer to any manner known in the art or later developed in which a signal is allowed to be transferred between two or more elements and the interposition of one or more additional elements is contemplated, although not required. Conversely, the terms "directly coupled," "directly connected," etc., imply the absence of such additional elements.

It is understood that various changes in the details, materials, and arrangements of the parts which have been described and illustrated in order to explain the nature of this invention may be made by those skilled in the art without departing from the scope of the invention as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

The invention claimed is:

1. A method of generating one or more clock signals in a receiver employing decision-feedback equalization comprising:

sampling a received signal, having a period T, using a data clock and a transition clock to generate a data sample signal and a transition sample signal, respectively;

performing a decision-feedback equalization correction on the data sample signal using a decision-feedback equalizer to generate decision-feedback equalization detected data bits, the equalizer having at least one tap and the at least one tap having a coefficient;

latching the transition sample signal after it has been sliced using a weighted threshold value to generate transition data bits; and generating one or more phase updates for at least one of the data clock and the transition clock based on the decision-feedback equalization detected data bits and the transition data bits;

wherein the weighted threshold value is calculated from at least one delayed bit of the decision-feedback equalization detected data bits multiplied by the coefficient of the at least one tap.

2. The method of claim 1, wherein the decision-feedback equalization correction is performed by an analog decision-feedback equalizer.

3. The method of claim 1, wherein the decision-feedback equalization correction is performed by an unrolled decision-feedback equalizer.

4. The method of claim 1, wherein the decision-feedback equalizer is a multi-tap equalizer having a first tap coefficient, and the weighted threshold value is calculated from the at least one delayed bit of the decision-feedback equalization detected data bits and the first tap coefficient.

5. The method of claim 1, wherein the decision-feedback equalization correction is performed by a hybrid equalizer comprising an analog decision-feedback equalizer in tandem with an unrolled decision-feedback equalizer.

6. A method of generating one or more dock signals in a receiver employing decision-feedback equalization, comprising:

sampling a received signal, having a period T, using a data clock and a transition clock to generate a data sample signal and a transition sample signal, respectively;

performing a decision-feedback equalization correction on the data sample signal using a decision-feedback equalizer having at least one tap, the at least one tap having a coefficient, to generate decision-feedback equalization detected data bits;

latching the transition sample signal after it has been sliced using a plurality of weighted threshold values to form a plurality of latched signals;

selecting, depending on a criterion, one of the plurality of latched signals to generate transition data bits, and generating one or more phase updates for at least one of the data clock and the transition clock based on the decision-feedback equalization detected data bits and the transition data bits;

wherein each of the weighted threshold values is calculated from the coefficient of the at least one tap multiplied by at least one delayed bit of the decision-feedback equalization detected data bits.

7. A receiver employing decision-feedback equalization, comprising:

a first sampler configured to sample a received signal in response to a data clock to generate a data sample signal;

a second sampler configured to sample the received signal in response to a transition clock to generate a transition sample signal;

a decision-feedback equalization corrector configured to correct the data sample signal to generate decision-feedback equalization detected data bits, the corrector having at least one tap and the at least one tap having a coefficient;

a detector configured to latch the transition sample signal that has been sliced using a weighted threshold value to generate transition data bits; and a clock and data recovery circuit configured to generate one or more phase updates for at least one of the data clock and the transition clock based on the decision-feedback equalization detected data bits and the transition data bits;

wherein the weighted threshold value is calculated from at least one delayed bit of the decision-feedback equalization detected data bits multiplied by the coefficient of the at least one tap.

8. A method of generating one or more clock signals in a receiver employing decision-feedback equalization, comprising:

sampling a received signal, having a period T, using a data clock and a transition clock to generate a data sample signal and a transition sample signal, respectively;

performing a decision-feedback equalization correction on the data sample signal using a decision-feedback equalizer having at least one tap, the at least one tap having a coefficient, to generate decision-feedback equalization detected data bits, the equalizer having an effective delay $\lambda$;

latching the transition sample signal after it has been sliced using a plurality of weighted threshold values to venerate a plurality of latched signals;

selecting, depending on a criterion, one of the plurality of latched signals to generate transition data bits; and generating one or more phase updates for at least one of the data clock and the transition clock based on the decision-feedback equalization detected data bits and the transition data bits;

wherein at least one of the plurality of weighted threshold values is calculated from at least one delayed bit of the decision-feedback equalization detected data bits multiplied by the coefficient of the at least one tap.

9. The method of claim 8, wherein:
a first one of the of the plurality of latched signals is $sgn(y(k-T/2)-b(1)v(k-1))$; and
a second one of the plurality of latched signals is $sgn(y(k-T/2)-b(1)v(k-2))$;
where $b(1)$ is the coefficient of the at least one tap, $y(k-T/2)$ is the transition sample signal sampled with a phase offset of $T/2$, and $v(k-1)$ and $v(k-2)$ are bits of the decision-feedback equalization detected data bits delayed by periods T and 2T, respectively.

10. The method of claim 9, wherein the first one of the plurality of latched signals is selected if $0 \leq \lambda < T/2$ and the second one of the plurality of latched signals is selected if $T/2 < \lambda \leq T$.

11. The method of claim 9, wherein plurality of latched signals further comprises a third latched signal $sgn(y(k-T/2)-b(1)[v(k-1)+v(k-2)]/2)$, and wherein the third one of the plurality of latched signals is selected if $\lambda = T/2$.

12. The method of claim 9, wherein the plurality of latched signals further comprises a third latched signal $sgn(y(k-\frac{1}{2}))$, where $y(k-\frac{1}{2})$ is the transition sample signal, and wherein the third one of the plurality of latched signals is selected when the decision-feedback equalization detected data bits have a Nyquist data pattern.

13. The method of claim 9 wherein the selecting step comprises alternatively selecting one of the first one and second one of the plurality of latched signals with each one of the decision-feedback equalization detected data bits.

* * * * *